United States Patent [19]

Priddy

[11] Patent Number: 5,984,366
[45] Date of Patent: Nov. 16, 1999

[54] UNALTERABLE SELF-VERIFYING ARTICLES

[75] Inventor: Dennis G. Priddy, Clearwater, Fla.

[73] Assignee: International Data Matrix, Inc., Clearwater, Fla.

[21] Appl. No.: 08/754,902

[22] Filed: Nov. 22, 1996

Related U.S. Application Data

[63] Continuation of application No. 08/280,787, Jul. 26, 1994, abandoned.

[51] Int. Cl.$^6$ .................................................. B42D 15/00
[52] U.S. Cl. ........................... 283/72; 235/380; 235/487; 235/488; 283/57; 283/77; 283/78; 283/93; 283/110; 283/901; 283/904; 380/24; 380/50; 428/13
[58] Field of Search .................... 283/72, 74, 75, 283/77, 78, 82, 93, 57–59, 901, 904, 107–112; 428/13; 235/380, 487, 488; 380/25.4, 22–24, 49, 50

[56] References Cited

U.S. PATENT DOCUMENTS

| | | |
|---|---|---|
| 3,632,995 | 1/1972 | Wilson . |
| 3,956,615 | 5/1976 | Anderson et al. . |
| 4,004,089 | 1/1977 | Richard et al. . |
| 4,016,404 | 4/1977 | Appleton ............................ 235/61.7 |
| 4,179,686 | 12/1979 | Bonicalzi et al. ................... 235/380 X |
| 4,430,563 | 2/1984 | Harrington . |
| 4,454,414 | 6/1984 | Benton .................................... 235/379 |
| 4,663,518 | 5/1987 | Borror et al. ........................... 235/487 |
| 4,782,221 | 11/1988 | Brass et al. . |
| 4,879,455 | 11/1989 | Butterworth et al. .................. 235/380 |
| 4,939,354 | 7/1990 | Priddy et al. . |
| 4,953,209 | 8/1990 | Ryder, Sr. et al. ....................... 380/23 |
| 4,972,476 | 11/1990 | Nathans ..................................... 380/23 |
| 4,995,081 | 2/1991 | Leighton et al. ........................ 902/4 X |
| 5,053,609 | 10/1991 | Priddy et al. . |
| 5,085,470 | 2/1992 | Peach et al. .............................. 283/58 |
| 5,124,536 | 6/1992 | Priddy et al. . |
| 5,126,542 | 6/1992 | Priddy et al. . |
| 5,180,902 | 1/1993 | Schick et al. ............................. 235/380 |
| 5,241,600 | 8/1993 | Hillis ............................................ 380/23 |
| 5,259,025 | 11/1993 | Monroe et al. .......................... 902/4 X |
| 5,321,751 | 6/1994 | Ray et al. .................................. 380/23 |
| 5,324,923 | 6/1994 | Cymbalski et al. ...................... 235/454 |
| 5,329,107 | 7/1994 | Priddy et al. . |
| 5,337,361 | 8/1994 | Wang et al. . |
| 5,343,031 | 8/1994 | Yoshida . |
| 5,568,607 | 10/1996 | Ishikawa et al. ...................... 395/182.2 |

FOREIGN PATENT DOCUMENTS

| | | |
|---|---|---|
| 0216298 | 4/1987 | European Pat. Off. . |
| 0334616 | 9/1989 | European Pat. Off. . |

(List continued on next page.)

OTHER PUBLICATIONS

H. Pender et al., *Electrical Engineers' Handbook;* (John Wiley & Sons; New York, 1936; pp. 6–29–6–32, Section 20).

*Primary Examiner*—Andrea L. Pitts
*Assistant Examiner*—Monica Smith
*Attorney, Agent, or Firm*—Orrick, Herrington & Sutcliffe

[57] ABSTRACT

Disclosed are methods, systems and articles of manufacture for creating and authenticating self-verifying articles. Self-verifying articles include, for example, commercial instruments (i.e., notes, drafts, checks, bearer paper, etc.), transaction cards (i.e., ATM cards, calling cards, credit cards, etc.), personal identification documents (i.e., driver's licenses, passports, personal identification papers, etc.) and labels affixed to package surfaces for identification of the package owner or sender, which, for example, may be used for verifying imported goods by customs agents. Self-verifying article creation includes receiving recipient-specific data, encoding a first selected subset of the recipient-specific data and fixing the encoded subset along with other human-recognizable data on a surface of an article. Self-verifying article authentication includes scanning a surface to locate an encoded first data set, decoding the first data set and comparing the decoded first data set with a control data set, which may also be fixed upon the surface, to determine the authenticity of the received self-verifying article.

26 Claims, 6 Drawing Sheets

FOREIGN PATENT DOCUMENTS

| | | |
|---|---|---|
| 334616 | 9/1989 | European Pat. Off. . |
| 0 372 837 | 6/1990 | European Pat. Off. . |
| 0440814 A1 | 8/1991 | European Pat. Off. .......... G07F 7/08 |
| 0490457 | 6/1992 | European Pat. Off. . |
| 560318 | 9/1993 | European Pat. Off. ............... 283/904 |
| 0599558 A2 | 6/1994 | European Pat. Off. .......... G07F 7/12 |
| 1369537 | 10/1974 | United Kingdom .............. G07F 7/02 |
| 2240948 | 8/1991 | United Kingdom . |
| 2248360 | 4/1992 | United Kingdom ............. H04N 7/18 |
| 9216913 | 10/1992 | WIPO . |
| 94/19770 | 9/1994 | WIPO .................................... 283/904 |

UNALTERABLE SELF-VERIFYING ARTICLES

This application is a continuation of application Ser. No. 08/280,787, filed Jul. 26, 1994, now abandoned.

TECHNICAL FIELD OF THE INVENTION

The present invention relates in general to encoding methods and systems, and in particular to methods, systems and articles of manufacture for creating and authenticating self-verifying articles.

BACKGROUND OF THE INVENTION

Modern life requires that individual identification and document authenticity be quickly, conveniently and reliably verified. The necessity for both individual and document verification arises in almost every commercial transaction. Additionally, the necessity for individual identification arises in both social and governmental settings with ever increasing frequency.

Commercial transactions requiring both document verification and individual identification include credit card, calling card, automatic teller machine ("ATM") and similar transactions, as well as other daily commercial transactions such as check cashing. For example, when a check is presented to a bank for payment, the bank is required to verify the authenticity of the check writer's signature (called the endorsement) and that there is enough money in the checking account to cover the check. Authenticity of the endorsement is determined by comparing the signature appearing upon the check with a signature sample of the check writer on file with the bank. A reasonably good forgery of the endorsement might enable an unauthorized person to illegally cash the check.

Alternatively, in non-commercial settings, identification issues often arise in the context of security. For example, common apartment and office building security systems require that anyone wishing to enter the building "sign in" in front of a security guard, and often, to present the guard with a previously issued personal identification document which authorizes access to the building. The security guard is required to exercise his best personal judgment to determine that the identification document is authentic and that the person presenting it is the person identified on the identification document. In such circumstances, and understandably so, a security guard may be deceived by a person who is correctly identified on a forged or altered identification document. In the governmental context, it is a requirement in many countries that citizens carry personal identification papers in public to be produced for review upon request by appropriate authorities. For example, private individuals are required to present to the police personal identification, such as a driver's license, at the scene of a traffic accident or when stopped for a traffic violation. Additionally, personal identification documents are required for admittance to voting polls, and when crossing international boundaries and/or importing or exporting goods.

Accordingly, a pronounced need exists for unalterable self-verifying personal, commercial and governmental identification cards, papers, documents, labels, packaging and other similar articles. For the purposes of this patent document, an article shall be defined as any item having a surface, which may include a substrate, to which data may be fixed. As used herein, the term fixed shall mean one or more of the following, but is not limited to, attached, imprinted, adhered, etched, scratched, painted, printed, peened, embedded, machined, drilled, stamped, or otherwise imaged.

One current solution requires the use of biometric information that is stored in a memory device carried by an individual. The term biometric information refers to a characteristic personal to an individual, such as a signature, a finger print or a picture, for example. A sample of biometric information to be used is obtained from the person at an "encodation" site where the memory device is programmed under secure conditions. The sample is formed into a code by conventional encoding techniques. The sample may be obtained by having the person place a hand, eye, face or other unique physical feature upon a scanning input device. The scanned information is then encoded to form a code which is subsequently stored to an alterable, portable memory device (i.e., magnetic strips, electronic or optical memory cards, floppy disks, etc.). The portable memory device is issued to the person. When the person's identity needs to be verified, the person presents the portable memory device at a "remote access/decodation" site where identification verification is to occur, and the information contained within the portable memory device is read from memory. Another sample of biometric information is then obtained by the person again placing a particular physical feature upon the input scanning device. The read code and the just sampled biometric information are compared by a machine to determine authenticity. In this regard, the read code may be decoded, e.g., using a process that reverses the encodation performed previously, or the sample information encoded, e.g., using the same encoding process used at the encryption site, to make the comparison. Because this method requires a processing system for performing data encoding and/or decoding, complex opto-electric hardware at every encodation and remote access site, and a memory device for each person, this solution is exceedingly expensive.

It is therefore an object of the present invention to provide an unalterable code, for use on an article, which contains biometric identification information personal to the authorized bearer of the article.

Another object of the present invention is to provide methods and systems for inexpensively, accurately and efficiently producing unalterable self-verifying personal and commercial articles.

A further object of the present invention is to provide methods and systems for accurately, efficiently and inexpensively authenticating presented self-verifying articles.

A still further object of the present invention is to provide methods and systems for verifying the authenticity of self-verifying articles presented at remote access sites which do not require expensive verification equipment, such as physical-trait-scanning input devices, or the inconvenience of a communication channel to a central location.

SUMMARY OF THE INVENTION

The invention is directed to a self-verifying article which contains an encoded machine-readable data set which includes recipient-specific biometric data. Self-verifying articles include, for example, commercial instruments (i.e., notes, drafts, checks, bearer paper, etc.), transaction cards (i.e., ATM cards, calling cards, credit cards, etc.), personal identification documents (i.e., driver's licenses, government benefit cards, passports, personal identification papers, etc.) and labels affixed to package surfaces, including for example identification of the package owner or sender, which may be used for verifying imported goods by customs agents. A subset of, or the whole of, the biometric data set may be, for example, a graphic image of a personal characteristic considered unique to a particular individual, such as, for example, a fingerprint, a retinal scan, a photo, a signature, etc., or some combination of the foregoing, is preferably encoded to generate a machine-readable data set. This article is preferably a low cost article, of paper or plastic, but may be any substrate, and the machine-readable data set is preferably fixed upon or in the article. The article also may, but need not, contain a human-readable version of the biometric data set.

In one embodiment of the invention, the encoded machine-readable data set is fixed upon the article in a manner which is neither comprehensible, nor detectable, by the human-eye, unless assisted by a suitably arranged reading device. For example, a check, or any other article for that matter, has fixed thereon a machine readable data set including the authorized user's signature. Thus, a would be forger would not have a sample of an authorized signature to copy. A comparison of the user's signature with the decoded signature permits verification at the site of use.

In another embodiment, a human-readable textual data set also appears on the article, optionally with selected subsets of the textual data set also being encoded and concatenated, interleaved, etc. with the encoded biometric data set. For the purpose of this patent document, a textual data set comprises all data which is not biometric data.

One embodiment of the invention, therefore, is a self-verifying article which includes a surface, and a data set, the data set comprising an encoded recipient-specific biometric data in a machine readable form. Another embodiment is a self verifying article which includes a surface, a first data set and a second data set fixed upon the surface, the second data set being an encoded copy of the first data set. An alternate embodiment is a self-verifying recipient-specific identification article which includes a surface, a textual data set including at least one textual data subset fixed upon the surface, a biometric data set including at least one biometric data subset fixed upon the surface, and a machine-readable data set including an encoded copy of the textual data set and the biometric data set, which are optionally concatenated, interleaved or otherwise combined, and fixed upon the article. The machine-readable data set is preferably configured as an optically readable binary code forming at least one matrix (or array). The matrices are commonly referred to as two-dimensional bar codes or matrix codes.

One aspect of the invention concerns a method of producing an unalterable self-verifying article which includes the steps of receiving a recipient-specific data set comprised of one or more recipient-specific data subsets, generating a machine-readable data set by selectively encoding a first recipient-specific data subset, and fixing the machine-readable data set, and, optionally, the first recipient-specific data subset onto a surface of the article. The machine-readable data set may preferably be fixed in one or more machine-readable matrices. The imprinted machine-readable data set may be fixed as visual binary data, e.g., onto a designated blank area of the article, or alternately, as previously introduced, the machine-readable data set may be imprinted over or under already printed areas of the article utilizing marking means, such as an ink that can be detected separate from the article print, e.g., an ultraviolet, infrared, or other color ink, or by placing the machine-readable data set on the article so that a permanent magnetic or fluorescent image may be selectively read. Yet another possibility, is that the machine-readable data set is fixed in a form that is discernable spectrally and the printing over the data set is a fake code that if photocopied or otherwise reproduced, produces an invalid code.

The machine readable data set alternatively may be physically fixed as binary data as voids. For the purposes of this patent document, voids shall include, but are not limited to, hollows, apertures, bubbles, detents, holes or the like or the absence thereof, which may optionally be configured in a matrix, such that the use of a physical material detection system capable of distinguishing the void/non-void areas is used. Such a detection system may include ultrasound, or other imaging technique, that has a return signal for determining the depth or density of a cell area to determine whether or not a void is present. Other optical techniques may be similarly used, such as are used in conventional compact disc technology. Preferably, when physical characteristics are used, a material may be used to fill in or cover any voids to provide the article with a smooth surface. Thus, the formation of an article may be a multilayer structure of which one layer contains the machine-readable code as voids.

Another alternative is an article having a layer upon which the machine-readable code is fixed that is opaque except for the code (or vice versa) so that a strong blacklight can be used to optically detect the code, not withstanding that the code is hidden by another layer.

Another aspect of the invention concerns a method of operation for verifying the authenticity of a self-verifying article. One such method includes scanning a self-verifying article of one of the aforementioned types which includes an encoded biometric data set, locating (or reading, etc.) and decoding the biometric data set, and comparing the decoded biometric data set to a recipient-specific sample and determining whether or not the decoded biometric data set corresponds to the recipient-specific sample. Another method includes the steps of receiving the self-verifying article, the self-verifying article including first and second data sets wherein the first data set is an encoded copy of a second data set, scanning the self-verifying article to locate (or read, etc.) the encoded first data set, decoding the encoded first data set, and comparing the decoded first data set with the second data set to determine the authenticity of the self-verifying article. In the preferred embodiment, the encoded first data set has been imprinted in one or more machine-readable matrices.

A processing system, in accordance with the principles of the present invention, for producing a unique machine-readable data set for fixing upon an article, includes an input port operable to receive a recipient-specific data set which includes a plurality of recipient-specific data subsets, a memory storage device operable to store a plurality of processing system instructions, a processing unit for generating the machine-readable data set, and optionally an output port for transmitting the produced machine-readable data set and the first recipient-specific data subset. The processing unit retrieves and executes at least one of the processing system instructions from the memory storage device. The processing system instructions direct the processing unit to selectively encode the first recipient-specific data subset. In one embodiment of the invention, the processing unit is further operable to configure the machine-readable data set as an optically readable binary code forming at least one matrix.

A processing system, in accordance with the principles of the present invention, for verifying the authenticity of a self-verifying article, includes an input port operable to receive (or scan, read, etc.) the self-verifying article, a memory storage device operable to store a plurality of processing system instructions, a processing unit for verifying the authenticity of the self-verifying article, and optionally an output port operable to transmit an output signal. The input port includes means controlled by the processing unit, or alternatively by another processing unit or input control device, for selectively scanning the surface of the self-verifying article. The processing unit retrieves and executes at least one of the processing system instructions from the memory storage device which directs the processing unit to locate an encoded first data set fixed upon the self-verifying article and to decode the encoded first data set. In one embodiment, the processing unit will further operate to compare the decoded first data set with a second data set fixed to the self-verifying article, and to generate an output signal indicating the authenticity of the self-verifying article. In an alternate embodiment, the processing unit will transmit the decoded first data set and the second data set to a central host processing system operable to compare the two data sets. In another embodiment, the decoded first data set will include biometric data which the output port will transmit to an output display device enabling an attendant to perform a visual comparison for identification verification of the bearer of the self-verifying article.

One embodiment for using and/or distributing the present invention is as software stored to a storage medium. The software includes a plurality of computer instructions for controlling one or more processing units for producing and/or authenticating unique self-verifying articles in accordance with the principles of the present invention. The computer will include the necessary encodation and/or decodation procedure/algorithms, or parts thereof, to be used. The storage mediums utilized may include, but are not limited to, magnetic storage, optical memory, and/or semiconductor chip, to name three examples.

Accordingly, an advantage of the present invention is the ability to provide an unalterable code for use on an article, the article containing biometric identification and character information personal to the authorized bearer of the article.

Another advantage is that the machine-readable code is fixed on the article using relatively inexpensive techniques, preferably by conventional printing equipment, that are highly reliable and accurate.

Another advantage of the present invention is the ability to provide self-verifying articles, as well as methods and systems for inexpensively, accurately and efficiently producing unalterable self-verifying personal identification documents and commercial instruments.

A further advantage of the invention is the ability to provide methods and systems for accurately, efficiently and inexpensively authenticating a presented self-verifying article.

A still further advantage of the invention is the ability to provide methods and systems for verifying the authenticity of self-verifying articles presented at remote access sites without requiring expensive verification equipment.

BRIEF DESCRIPTION OF THE DRAWINGS

For a more complete understanding of the present invention, and the advantages thereof, reference is now made to the following descriptions taken in conjunction with the accompanying drawings in which like numbers designate like parts, and in which.

DETAILED DESCRIPTION OF THE INVENTION

Figure 1A:
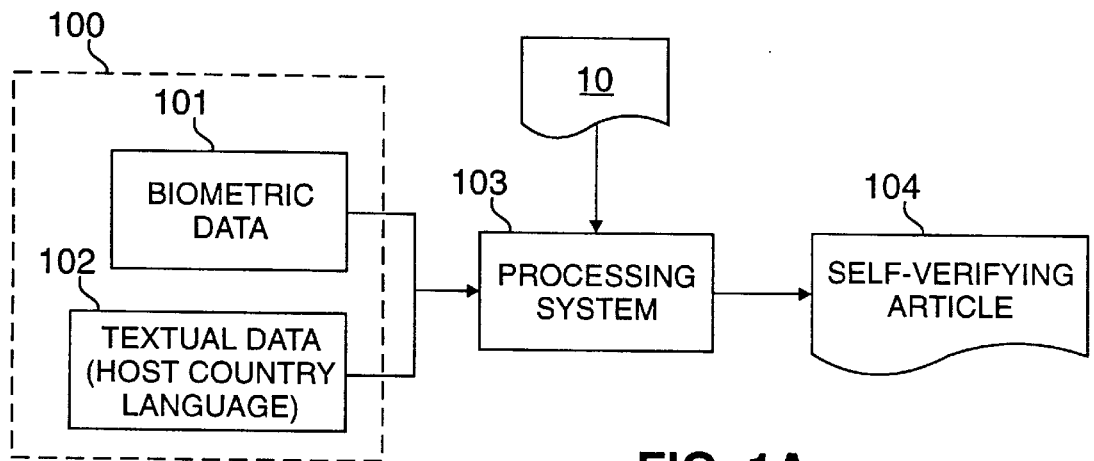
FIG. 1A illustrates a functional block diagram of a system for producing a self-verifying article in accordance with the principles of the present invention.

FIG. 1A illustrates a functional diagram of a system for producing a self-verifying article in accordance with the present invention. The system includes an input data set 100, which includes a biometric data set 101 and an optional textual data set 102, an article 10, a processing system 103 and a self-verifying article 104. As previously introduced, data set 100 is comprised of recipient specific data. Biometric data set 101 may include one or more physical traits personal to the potential article recipient (i.e., photo, retinal scan, finger print, signature, etc.), while textual data set 102, which is optionally included in input data set 100, may include one or more textual attributes (i.e., name, address, height/weight, eye color, etc.). Processing system 103 is operable to produce self-verifying article 104 by generating a unique machine-readable data set for fixing upon article 10.

Processing system 103 includes input means, processing means, output means and article producing means. The input means are for receiving input data set 100 and article 10. The processing means are for validating input data set 100, both syntactically and semantically, and encoding selected subsets of biometric data set 101, and, optionally, selected portions of textual data set 102 (optionally, the data to be encoded may first be encrypted, if desired). The output means are for transmitting a validated and encoded data set, along with the selected subsets of biometric data set 101, and optionally with the textual data set 102, to the article producing means. The article producing means are for fixing the validated and encoded data set, and for optionally fixing the selected subsets of biometric data set 101 and optionally textual data set 102, to article 10, thereby producing self-verifying article 104.

In the preferred embodiment, processing system 103 ensures data integrity by encoding all selected biometric and textual data subsets into a compact unalterable machine-readable data set, and subsequently, configuring the machine-readable data set as one or more matrices. If preferred, the machine-readable data set may be divided into two or more individual segments, which segments may then be incorporated into two or more two-dimensional machine-readable matrices, which may or may not appear visually similar in size and density. The multiple matrices, though physically separate, may contain check values and features which assure the detection of any attempted alteration of either the human-readable text and/or the machine-readable matrices. In this regard, the encoded biometric data and textual data can be concatenated into one data string, divided by approximately two, and then formed into two matrices of approximately equal size and density. Alternatively, the biometric data and text data may be interleaved, for example, in alternating bits, bytes, group of bytes, etc. to form a data string which is then divided into the two matrices. Preferably, each matrix is provided with a checksum for verifying the data integrity of each matrix independently. In addition, or alternatively, the matrices may have an interdependent checksum that is used to verify the data integrity of both matrices collectively. As a result of these checksums, if one matrix is altered, or if both matrices are altered, invalid data will not be read. Advantageously, interleaving biometric data and textual data according to a predetermined routine enhances the ability to detect altered matrices. Alternatively, biometric data set 101 could be formed as one matrix and textual data set 102 could be formed as a second matrix.

In one embodiment, enhanced data security can be obtained and maintained by verifying the machine-readable data set for acceptability against predetermined criteria which may include searching a data base (e.g., an organized, comprehensive collection of data stored for use by processing system(s)) of previously issued articles to determine uniqueness. Note, in an alternate embodiment input data set 100 may be received at a remote access encodation site not equipped with the verification and/or encodation algorithm (s), in which case, a data signal representation of both the recipient-specific biometric data and the related textual data may be transmitted to a secure central host (shown in a similar context in FIG. 2A), the central host then performs the above mentioned verification. The transmission may be by wired or non-wired communication.

If the recipient is determined acceptable, the recipient-specific biometric data is encoded, which preferably includes utilization of compression algorithms, combining the biometric data subsets, and optionally, the textual data subsets, into one or more machine-readable matrices. If input data set 100 was received at a remote access encodation site not equipped with the encodation algorithm(s), the resulting encoded binary string is transmitted as previously discussed to the remote access encodation site. A standard article issuance device (shown in FIG. 1B) then fixes the machine-readable data set onto one or more self-verifying articles. As the articles are created and ejected from the article issuance device, a record of the event is automatically entered into the data base, which, if input data set 100 is received at a remote access encodation site, may be located at the central host. Entry of the record insures that duplicate articles are not inadvertently issued at a later date. Note that the number of articles issued is directly related to the intended use of the articles. Applications of this aspect of the invention include issuing only a single driver's license having a unique encoded photo, or issuing multiple articles, such as checks, traveler's checks, bank account withdrawal slips, etc. having the same encrypted signatures.

Figure 1B:
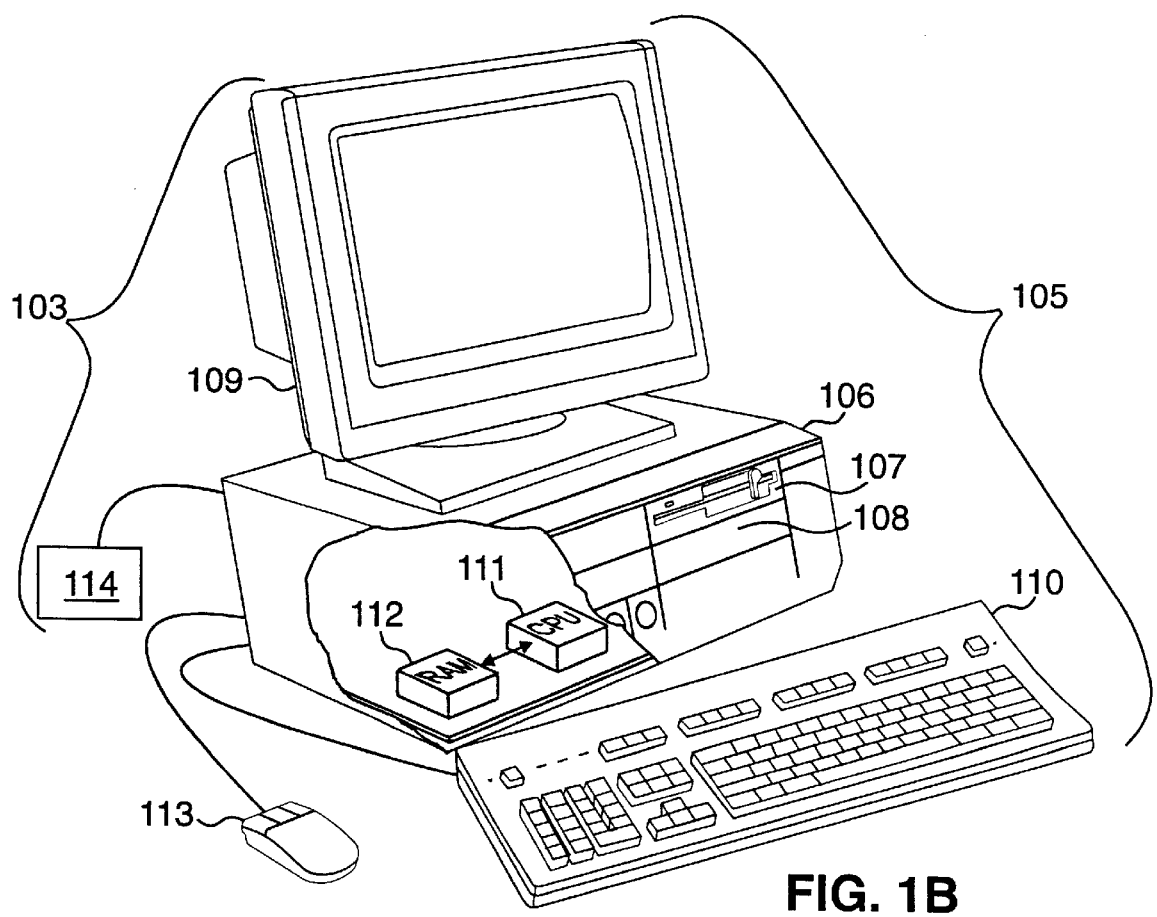
FIG. 1B illustrates an isometric view of the processing system set forth in FIG. 1A.

FIG. 1B illustrates an isometric view of processing system 103. Processing system 103 includes a personal computer ("PC") 105 coupled with a article issuance device 114. PC 105 is comprised of a hardware casing 106 (shown as having a cut away view), a monitor 109, a keyboard 110 and optionally a mouse 113. Hardware casing 106 includes both a floppy disk drive 107 and a hard disk drive 108. Floppy disk drive 107 is operable to receive, read and write to external disks, while hard disk drive 108 is operable to provide fast access data storage and retrieval. Although only floppy disk drive 107 is illustrated, PC 105 may be equipped with any suitably arranged structure for receiving and transmitting data, including, for example, tape and compact disc drives, and serial and parallel data ports. Within the cut away portion of hardware casing 106 is a processing unit, central processing unit ("CPU") 111, coupled with a memory storage device, which in the illustrated embodiment is a random access memory ("RAM") 112. Although PC 105 is shown having a single CPU 111, PC 105 may be equipped with a plurality CPUs 111 operable to cooperatively carry out the principles of the present invention. Article generating device 114 is operable to receive one or more output data sets from PC 105, and fix the output data sets to the article's surface.

Although PC 105 and article generating device 114 have been utilized for illustrating one implementation of processing system 103, the invention may alternately be implemented within any processing system having at least one processing unit, including, for example, sophisticated calculators and hand held, mini, main frame and super computers, including RISC and parallel processing architectures, as well as within network combinations of the foregoing, and may utilize any suitably arranged article producing means.

Figure 1C:
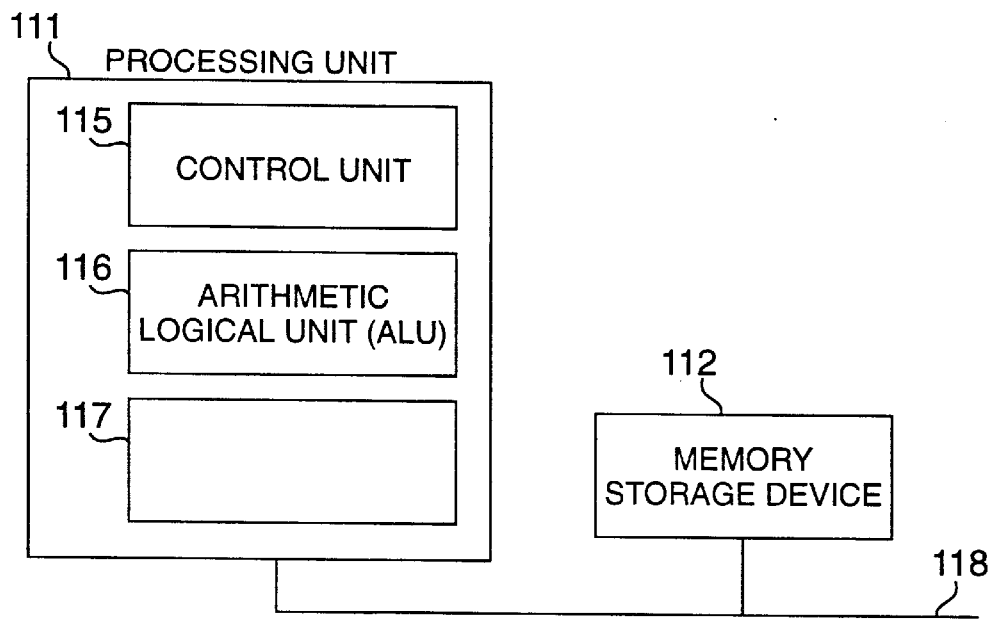
FIG. 1C illustrates a block diagram of a processing unit and a memory storage device.

FIG. 1C illustrates a conceptual block diagram of one of any number of sub-processing systems which may be utilized in conjunction with FIGS. 1A and 1B. The sub-processing system includes a single processing unit, such as CPU 111, coupled via data bus 118 with a memory storage device, such as RAM 112. Memory storage device 112 is operable to store one or more instructions which processing unit 111 is operable to retrieve, interpret and execute. Processing unit 111 includes a control unit 115, an arithmetic logic unit ("ALU") 116, and a local memory storage device 117, such as, for example, stackable cache or a plurality of registers. Control unit 115 is operable to fetch instructions from memory storage device 112. ALU 116 is operable to perform a plurality of operations, including addition and Boolean AND needed to carry out instructions. Local memory storage device 117 is operable to provide high speed storage used for storing temporary results and control information.

Figure 2A:
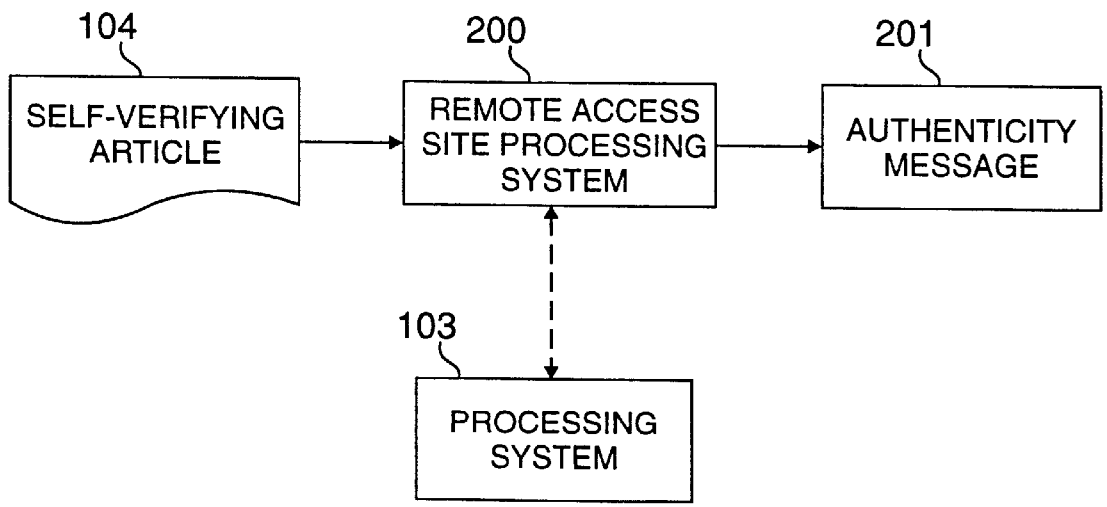
FIG. 2A illustrates a functional block diagram of a system for verifying the authenticity of a received self-verifying article in accordance with the principles of the present invention.

FIG. 2A illustrates a functional block diagram of a system for verifying the authenticity of a received self-verifying article in accordance with the present invention. The system includes self-verifying article 104, a remote access site processing system 200, optionally coupled with a central host processing system 103 (as indicated by the broken line), and an authenticity message displaying means 201, such as a display device, a printer, or other suitably arranged indicating device. Self-verifying article 104 includes at least one encoded data set which includes a first data subset that is an encoded copy of a portion, or the whole, of a biometric data set. Self-verifying article 104 also preferably includes a text data set or a biometric data set, or both.

Remote access site processing system 200 includes input means, processing means and output means. The input means are for receiving self-verifying article 104. The processing means are for verifying the authenticity of self-verifying article 104, which may include communications between remote access site processing system 200 and central host processing system 103. The output means are for transmitting an authenticity message produced by the processing means to display means 201.

The processing means are operable to scan self-verifying article 104 to locate and decode the encoded first data set and to compare the decoded first data set with a second data set, which is, either obtained from the bearer of the article or is fixed to self-verifying article 104, and to generate the output signal indicating authenticity of article 104. In an alternate embodiment, the processing means either selectively bypasses or is not operable to perform the comparison of the decoded first data set and the second data set. Instead, the processing means generates an output signal representative of the decoded first data set, e.g., a graphic image display of the portion of the biometric data set, and the second data set to a display device for manual comparison and verification by a processing system operator. Alternatively, the processing system operator may manually compare the decoded first data set, and optionally the second data set (if one is fixed to the article), with the article bearer or a biometric data set obtained from the bearer, e.g., the bearer's signature or appearance, or from a database.

The illustrated system for verifying the authenticity of self-verifying article 104 may utilize a variety of devices including, for example, portable terminals, fixed station readers, and flat bed scanners, each of which may directly incorporate decoder capability or have decoder capability available at a base/host station, such as processing system 103, via wired or radio frequency, short wave, cellular, infrared or other form of non-wired communication. Remote access site processing system 200 and/or central host processing system 103 may be configured with keyboards and display screens of sufficient resolution to accurately display the encoded biometric image and/or textual data, and may incorporate imaging apparatus necessary to convert machine-readable data sets into binary machine language bits in preparation for decoding. The imaging apparatus may be based on any of a number of technologies, including CCD, CMOS, and NMOS or other forms of light sensitive sensors, which sensors may be structured in the form of a two-dimensional area or one-dimensional linear arrays, or a single beam laser reading for scanning a two-dimensional image in a raster pattern.

One preferred embodiment of imaging apparatus is a linear array scanner that is vertically aligned with a solid border of an imprinted machine readable code 205, and when two or more matrices are used, these matrices are arrayed in parallel orientation so that the two symbols can be passed by the CCD scanner using a conventional card swipe action as in conventional magnetic strip reading. The matrices are then read and a video image of each matrix is stored in memory for processing. Imaging may also be achieved through the use of lasers, laser-diodes, infrared or other such binary imaging technologies which devices may also be structured in the form of two-dimensional area or one-dimensional linear arrays. Additionally, readers may include the ability to automatically verify the images and information encoded within the machine-readable matrix to the human recognizable version on the same article. In one embodiment, this comparison may be accomplished internal to remote access site processing system 200's memory thereby precluding the need for key pads and/or high resolution display screens on the terminals. Alternately, as introduced, operators may visually compare the information displayed on the terminal screen to the human readable information now present on the article and/or to the article bearer.

Figure 2B:
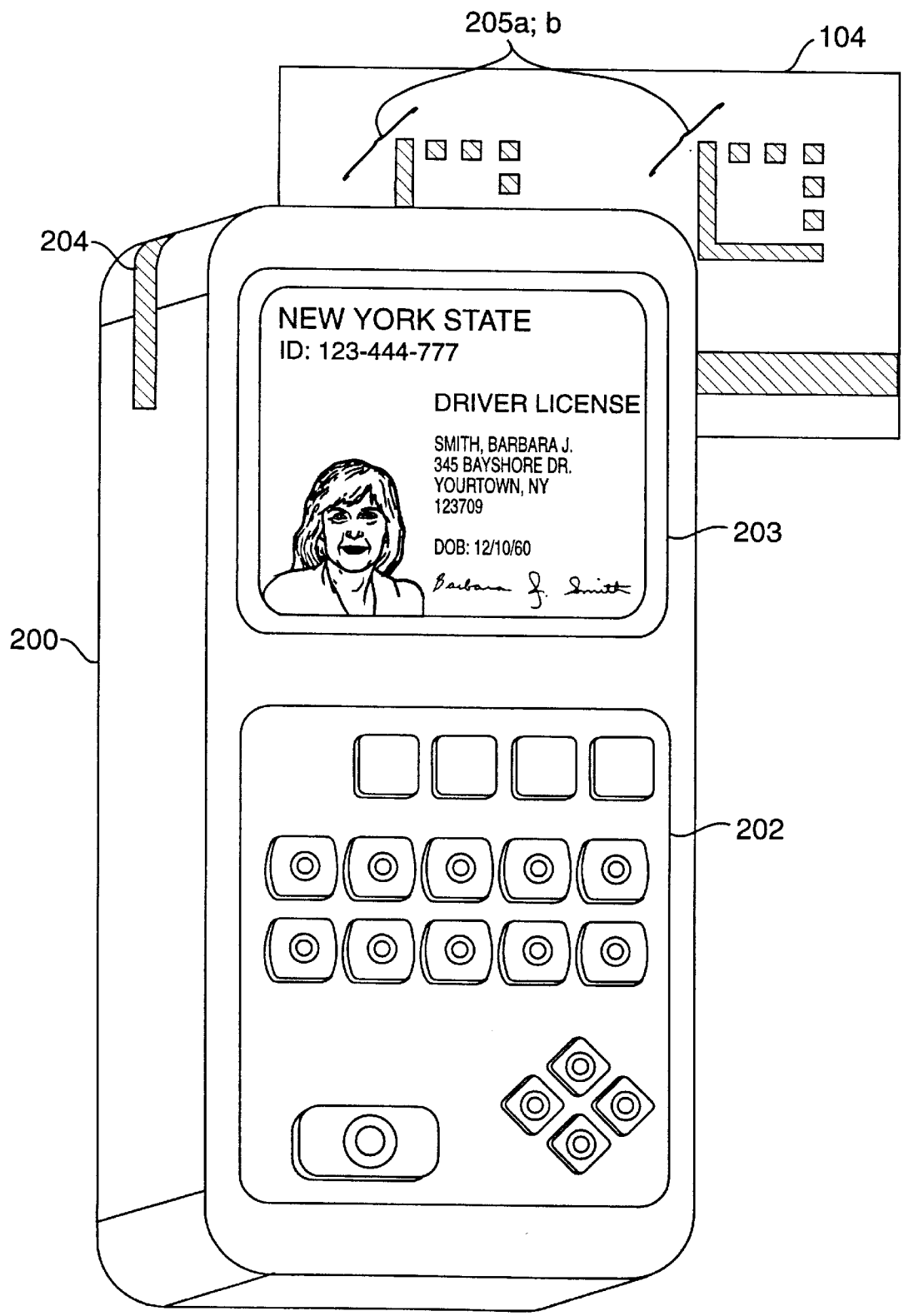
FIG. 2B illustrates an isometric view of the remote access site processing system set forth in FIG. 2A.

FIG. 2B illustrates an isometric view of a hand held computer which may be used as remote access site processing system 200. Hand held computer 200 includes a keypad 202, a display screen 203 and an input port 204. Keypad 202 includes a systematic arrangement of keys for manually receiving input data from a user. Display screen 203 is for displaying an authenticity message, and/or biometric and/or textual data. Input port 204 is for receiving self-verifying article 104, here illustrated as a driver's license, which in the illustrated embodiment includes encrypted machine-readable data sets 205a;b configured as two optically readable binary matrices. Remote access site processing system 200 includes at least one processing unit and one memory storage device, such as the sub-processing system illustrated in FIG. 1C. Preferably, the processing unit includes a microprocessor having associated memory (non-volatile storage for containing the program instruction set to identify and decode the matrices, and volatile memory for a data processing work area), a video memory for storing an image of the matrices to be decoded, and associated signal conditioning circuits, which are mounted on a single printed circuit board.

Figure 3:
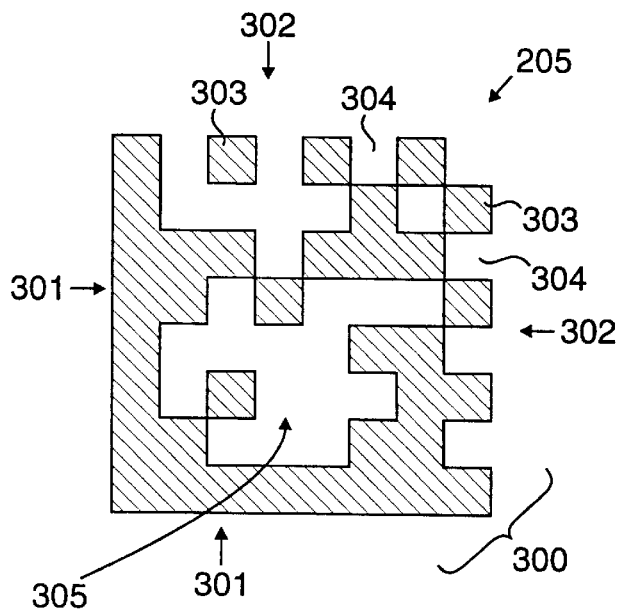
FIG. 3 illustrates a machine-readable binary coded matrix.

FIG. 3 illustrates a preferred single machine-readable binary coded matrix, generally indicated as a matrix 205. Matrix 205 is a sample of the Data Matrix symbology developed by International Data Matrix, Inc., Clearwater, Fla., the assignee of this invention. Matrix 205 has a perimeter 300 formed by intersecting sides 301 formed of solid lines and intersecting perimeter sides 302 formed of dark perimeter squares 303 and light perimeter squares 304 in an alternating pattern. Data, generally indicated as 305, is stored within perimeter 301 of matrix 204 by converting each character to be stored to a visual binary code represented by dark and light squares corresponding to ones and zeros of encoded binary information. For a more complete description of the configuration of matrix 205, reference is made to U.S. Pat. No. 4,939,354, entitled "Dynamically Variable Machine Readable Binary Code and Method for Reading and Producing Thereof" and to co-pending patent application, U.S. Pat. No. 5,324,923, entitled "Apparatus for Producing a Dynamically Variable Machine Readable Binary Code and Method for Reading and Producing Thereof," commonly owned by the assignee of this patent document, and which are incorporated herein by reference.

Figure 4A:
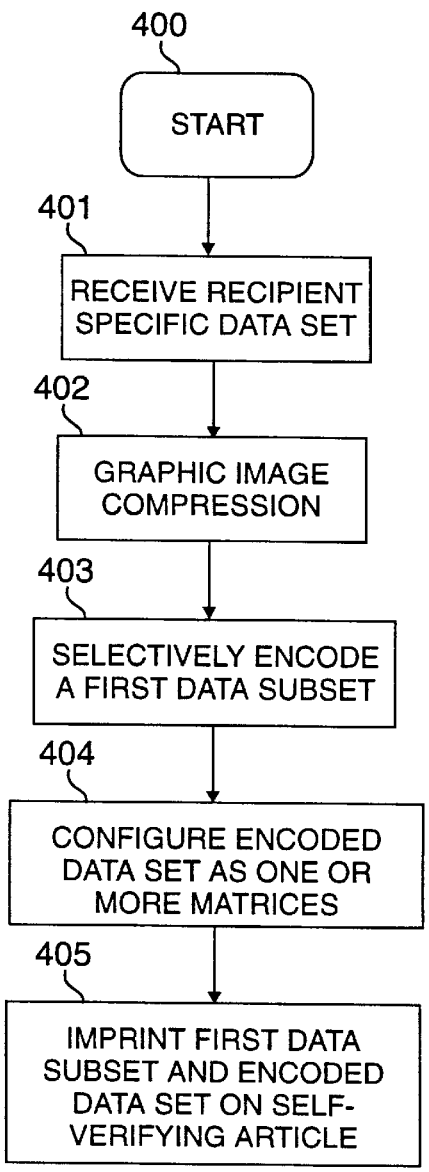
FIGS. 4A and 4B illustrate flow diagrams for producing an unalterable self-verifying article in accordance with the embodiment illustrated in FIG. 1A.

FIG. 4A illustrates a flow diagram for producing an unalterable self-verifying article in accordance with the embodiment illustrated in FIG. 1A. Upon entering START block 400, the process according to the principles of the present invention begins. The recipient-specific data set, which is comprised of at least one data subset, is received by processing system 103 (input block 401). Processing system 103 preferably performs a graphic image compression of a first data subset. Image compression by a factor of approximately 50:1 or better is preferred to obtain a digital representation of the acquired data. Such compressed data is capable of reproducing on a conventional graphic display screen the recipient specific image without any significant degradation of visual quality (block 402). The image compression may be by any standard routine e.g., Discrete Cosine Transform (DCT), LZW (Lempel-Ziv), fractal, or others to reduce the amount of bits required to encode the first data subset. A compression ratio of 50:1 is deemed suitable, but other ratios may be used. In addition to data compression, a graphic image enhancement routine may be performed on the first data subset, preferably before the data compression step, in order to enhance the image contrast, sharpen and smooth edges and reduce the effect of shadows, particularly for imaging a photograph of the recipient. The foregoing improves the digital image for more effective data compression. Suitable image enhancement routines are known, and described R. Gonzalez et al., Digital Image Processing, published by Addison-Wesley Publishing Co. (Reading Mass.) 1987. Processing system 103 selectively encodes the compressed first data set, thereby generating a machine-readable data set (processing block 403). This selectively encoding step is more fully discussed in connection with the detail description of FIG. 4B. In one embodiment of the invention, processing system 103 is further operable to configure the machine-readable data set as an optically readable binary code forming one or more matrices (processing block 404). Processing system 103 fixes the machine-readable data set and the first recipients-specific data subset onto a surface of an article, thereby producing self-verifying article 104 (processing block 405). In one embodiment, the matrix is fixed on the article using a conventional printing process, e.g., thermal, thermal transfer, ink-jet, bubble-jet, laser jet, dot matrix printing, etc. Alternatively, the matrix or matrices may be fixed subsurface, e.g., by laminating a top surface or by placing the matrix over the printed layer of a multilayer article. In another embodiment, the machine-readable data set is imprinted over an already printed area of the article, such as the photograph on a driver's license for example. In yet another embodiment, the matrix is formed by introducing bubbles or voids into the article, or drilling or punching holes into or through the article, according to the matrix pattern, such that the code is machine readable by a technique capable of detecting the absence or presence of material, or the relative density of material, or the depth of a bubble, void, hole or the like in the article, e.g., ultrasonically, or by a light measuring system or other suitable imaging system having a bounceback signal capable of distinguishing the code.

Figure 4B:
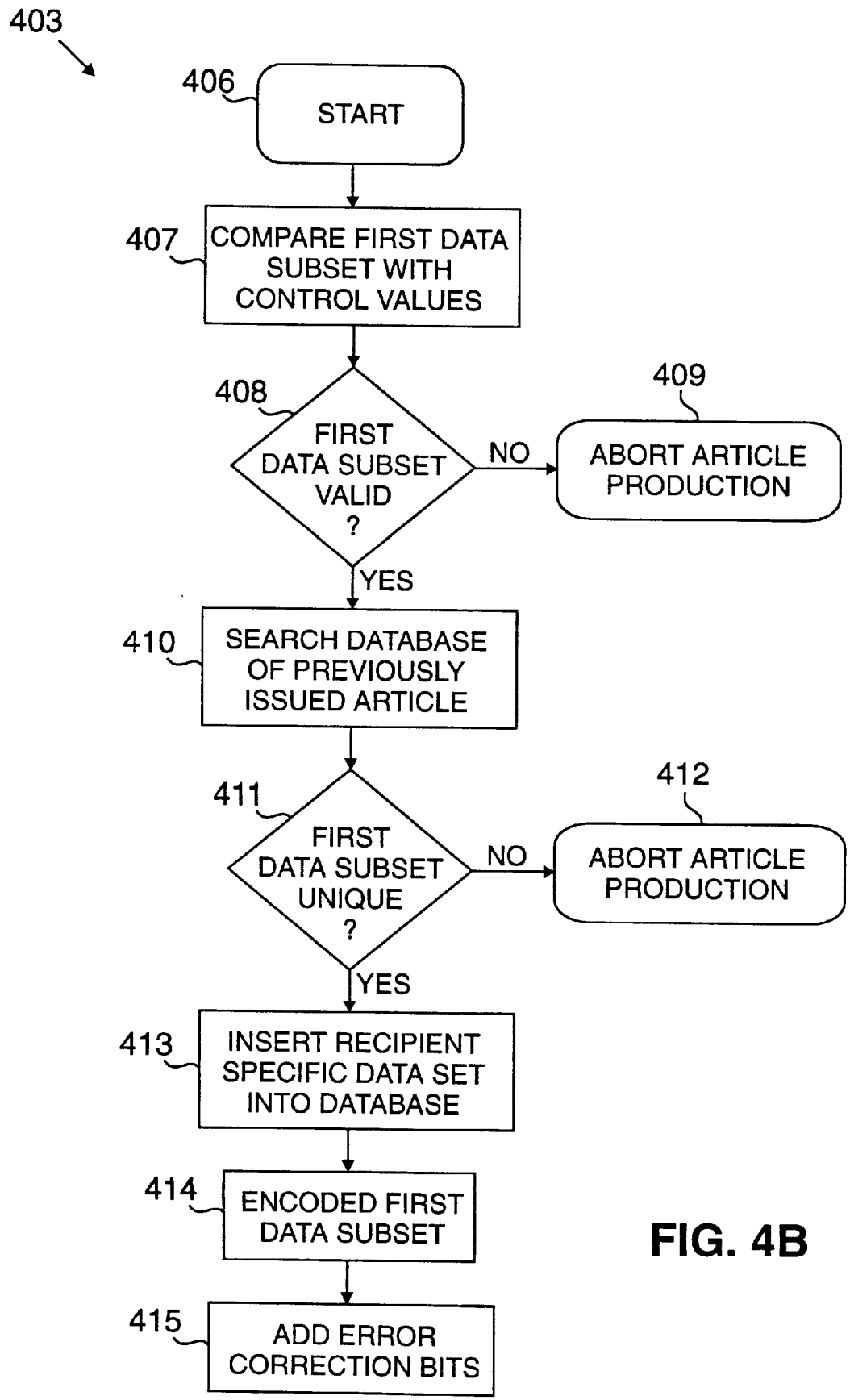

FIG. 4B illustrates a more detailed flow diagram of processing block 402 illustrated in FIG. 4A. Upon entering START block 406, the selective encodation of the first data set begins. Processing system 103 compares the first data set with system control values to determine if the first data set is within acceptable tolerances (processing block 407). The step of comparing may include, for example, syntactic and/or semantic analysis. If it is determined that the first data set is invalid as received ("N" branch of decisional block 408), then processing system 103 aborts self-verifying article production (termination block 409). Alternatively, if it is determined that the first data set is valid are received ("Y" branch of decisional block 408), then processing system 103 searches a data base of previously issued articles to determine if the issued article is unique (processing block 410), uniqueness being determined on a subjective basis as a function of the type of article being produced. Note that the data base utilized by processing system 103 may be internal or external to processing system 103, and that in either system, processing system 103 may search the data base directly, or indirectly. For example, the data base may be stored remotely and controlled by another processing system with which processing system 103 communicates. If it is determined that the first data set is not unique as received ("N" branch of decisional block 411), then processing system 103 aborts self-verifying article production (termination block 412). Alternatively, if it is determined that the first data set is valid as received ("Y" branch of decisional block 411), then processing system 103 selectively inserts one or more subsets of the received recipient-specific data set as at least one record into the data base (processing block 413). Processing system 103 then encodes the first data set (processing block 414), and in one embodiment adds error correction bits to the encoded first data set (processing block 415).

The selective encodation of only the first data set as embodied within FIGS. 4A and 4B was for illustrative purposes only, and it is understood that among the various aspects and features of the present invention is the ability to selectively encode a plurality of compressed recipient-specific data subsets, and to subsequently concatenate, interleave, etc. the encoded subsets, thereby forming a single machine-readable data set. Further, when two or more data subsets are encoded and concatenated, interleaved, etc. together, processing system 103 is operable to configure the machine-readable data set into one or more optically readable matrices wherein individual encoded data subsets may span two or more matrices.

Figure 5:
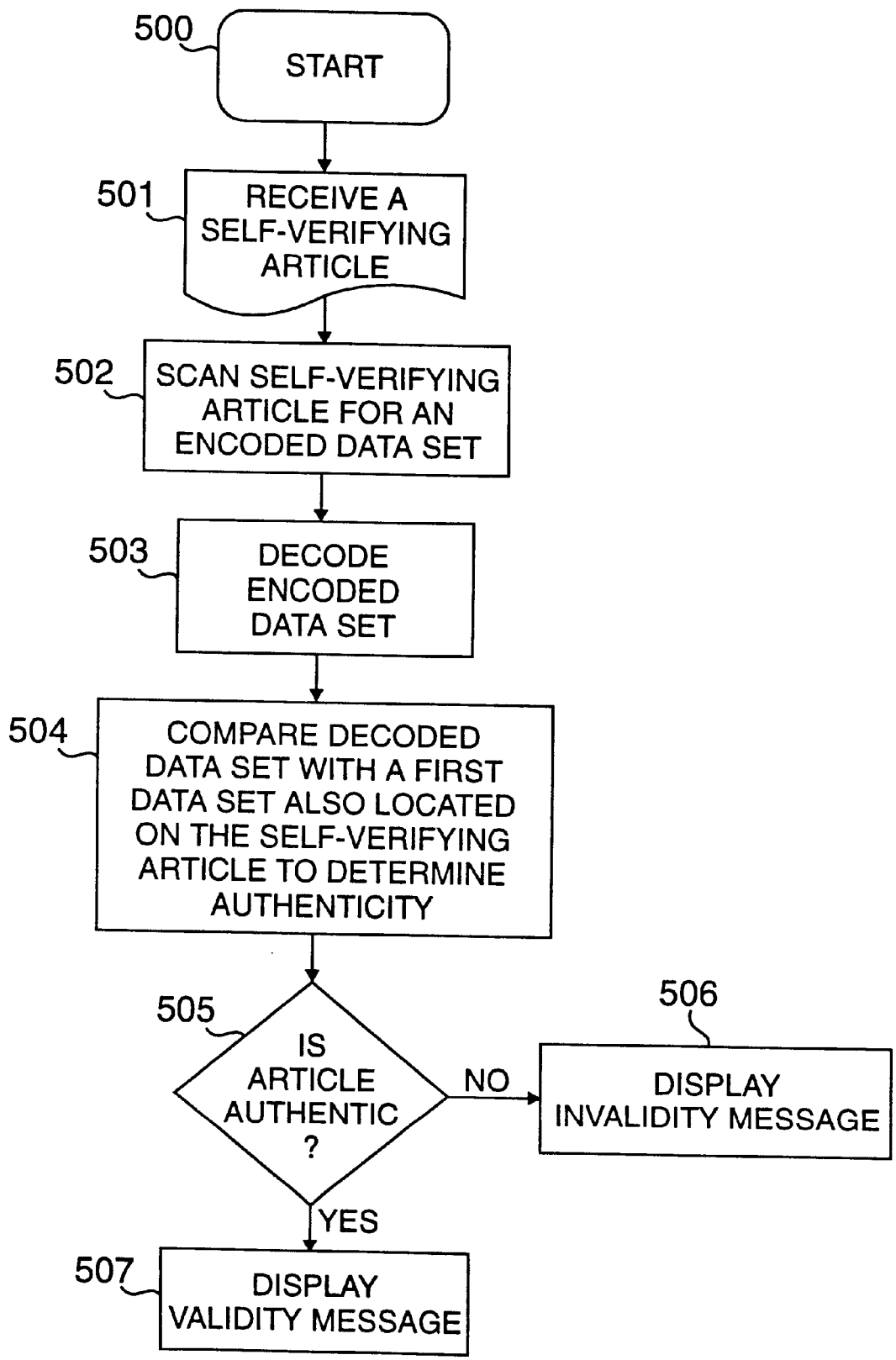
FIG. 5 illustrates a flow diagram for verifying the authenticity of a received self-verifying article in accordance with the embodiment illustrated in FIG. 2A.

FIG. 5 illustrates a flow diagram for verifying the authenticity of a received self-verifying article in accordance with the embodiment illustrated in FIG. 2A. Upon entering START block 500, the process according to the principles of the present invention begins. The self-verifying article, which in this embodiment includes a plurality of data sets wherein a first data set is an encoded copy of a second data set, is received by a remote access site processing system 200 (input block 501). Remote access site processing system 200 then scans the received self-verifying article to locate the encoded first data set (processing block 502). Remote access site processing system 200 decodes the encoded first data set (processing block 503), and compares the decoded first data set with the second data set to determine the authenticity of the received self-verifying article (processing block 504).

In one embodiment, the comparison step is accomplished through communications between remote access site processing system 200 and processing system 103, wherein processing system 103 maintains a data base of recipient-specific data relating to previously issued self-verifying articles. In this embodiment, communications between remote access site processing system 200 and processing system 103 may be accomplished via wired or non-wired communication means. In an alternate embodiment, at least the decoded first data set, and optionally the second data set, are transmitted to an output display device for manual comparison by a system operator. If it is determined that the decoded first data set is not authentic ("N" branch of decisional block 505), then remote access site processing system 200 displays an authenticity message 201 indicating that the self-verifying article is invalid (output block 506). Alternatively, if it is determined that the decoded first data set is authentic ("Y" branch of decisional block 505), then remote access site processing system 200 displays an authenticity message 201 indicating that the self-verifying article is valid (output block 507).

In another embodiment, prior to decoding the encoded first data set, remote access site processing system 200 converts the received self-verifying article into a digital bit-map image, and separates the digital bit-map image into a plurality of regions, wherein a first region includes the encoded first data set and a second region includes the second data set. In this embodiment, both the first and second regions may include a plurality of biometric and/or textual data subsets which remote site processing system 200 is further operable to convert into common data formats for processing.

As noted previously, one embodiment of the self verifying article contains two matrices which have a first data set of biometric data and a second data set of textual data. In addition, in one embodiment, the article also may contain a magnetic stripe for containing alterable data, which may be programmed by scanning the machine readable matrices, decoding certain data contained therein and, decoding that data (with or without other data), onto the magnetic stripe. This makes the self verifying article useful in applications which require reading a magnetic stripe.

A further use of the invention is to prevent software piracy. Software is a special form of program which has been recorded to a storage medium, such as one of the above identified storage mediums. Software enables programs to be freely transferred or copied from one storage medium to another, which enables unlicensed users to obtain illegal copies of the software. For example, in one embodiment, the purchaser of a processing system provides a hardware vendor with industry standardized personal data, which may include biometric data, which is, optionally encrypted, and stored internal to the processing system. Whenever the processing system purchaser buys software, the purchaser is again required to provide such industry standardized personal data, which is compressed, optionally encrypted, encoded into a machine-readable data set, preferably as one or more binary coded matrices, and fixed to the surface of a portable storage medium, such as a floppy or compact disk. When the software is loaded onto the processing system, the matrices are scanned, decoded and verified in accordance with the principles of the present invention, compared with the previously stored data to ensure a commonality of ownership, thereby limiting software piracy. If common ownership is found, then the software is loaded onto the processing system along with the decoded industry standardized personal data. In the event the processing system owner transfers ownership of the processing system, the new owner, in order to load his software, will have to have the industry standardized personal data redefined, which could suspend the new owner's use of the existing software or automatically delete the existing software. In the event use of the software is suspended, a "transfer" of ownership routine might be available to reactivate the suspended use of the existing software if ownership of the particular software was legally transferred.

Although the present invention and its advantages have been described in detail, it should be understood that various changes, substitutions and alterations can be made herein without departing from the spirit and scope of the invention.

What is claimed is:

1. A self-verifying article comprising:
   a surface;
   a first data set fixed upon said surface; and
   a second data set fixed upon said surface, said second data set being all encoded copy of at least a portion of said first data set and being configured as an optically readable code forming at least one matrix array having a perimeter and alternating black and white symbols alone said perimeter.

2. The self-verifying article as set forth in claim 1 wherein said second data set comprises biometric data.

3. The self-verifying article as set forth in claim 1 wherein portions of said first and second data sets comprise biometric data.

4. A self-verifying article comprising:
   a surface,
   a first data set fixed upon said surface; and
   a second data set fixed upon said surface, said second data set being an encoded copy of at least a portion of said first data set,
   wherein said second data set comprises biometric data and is configured as an optically readable code forming two matrix arrays.

5. The self-verifying article as set forth in claim 1 further comprising:
   a third data set fixed upon said article, said third data set comprising textual data.

6. The self-verifying article as set forth in claim 5 further comprising:
   a fourth data set fixed upon said article, said fourth data set is an encoded copy of at least a portion of said third data set.

7. The self-verifying article as set forth in claim 6 wherein said second and fourth encoded data sets are combined together forming one machine-readable data set.

8. The self-verifying article as set forth in claim 1 wherein said second data set is fixed upon said article and is undetectable to the human-eye.

9. The self-verifying article as set forth in claim 1 wherein said article is a commercial instrument and said second data set includes an endorsement of the drawer/maker/owner of said commercial instrument.

10. The self-verifying article as set forth in claim 1 wherein said article is a transaction card.

11. The self-verifying article as set forth in claim 1 wherein the article further comprises a first outer surface and a second outer surface wherein the second data set is formed as an array of voids between the outer surfaces of said article.

12. A recipient-specific identification article comprising:
    a surface; and
    a machine-readable data set fixed upon said surface, said machine-readable data set including encoded biometric data configured as an optically readable code forming at least one matrix.

13. The recipient-specific identification article as set forth in claim 12 wherein said fixed machine-readable data set is not detectable by an unaided human-eye.

14. The recipient-specific identification article as set forth in claim 12 wherein said article is a transaction card.

15. The recipient-specific identification article as set forth in claim 12 wherein said article is a commercial instrument.

16. The recipient-specific identification article as set forth in claim 12 further comprising a textual data set fixed upon said surface, wherein said machine-readable data set includes an encoded subset of said textual data set.

17. The recipient-specific identification article as set forth in claim 16 wherein said machine-readable data set is configured as an optically readable binary code forming two matrices.

18. The recipient-specific identification article as set forth in claim 17 wherein said encoded biometric data and said encoded subset of textual data are combined to form a single data set.

19. The recipient-specific identification article as set forth in claim 18 wherein said encoded biometric data and said encoded subset of textual data are concatenated together to form said single data set.

20. The recipient-specific identification article as set forth in claim 18 wherein said encoded biometric data and said encoded subset of textual data are interleaved to form said single data set.

21. A self-verifying article comprising:
    a surface;
    first and second data sets;
    third and fourth data sets fixed upon said surface, said third data set being an encoded copy of at least a portion of said first data set and said fourth data set being an encoded copy of at least a portion of said second data set,
    wherein said third and fourth encoded data sets are concatenated, forming one machine-readable data set which is encoded as at least two matrix arrays fixed to said surface.

22. The self-verifying article of claim 21 wherein said first data set comprises biometric data and said second data set comprises textual data.

23. A self-verifying article comprising:

a surface;

first and second data sets;

third and fourth data sets fixed upon said surface, said third data set being an encoded copy of at least a portion of said first data set and said fourth data set being an encoded copy of at least a portion of said second data set, wherein said third and fourth encoded data sets are interleaved forming one machine-readable data set which is encoded as at least two matrix arrays fixed to said surface.

24. The self-verifying article of claim 23 wherein said first data set comprises biometric data and said second data set comprises textual data.

25. The self-verifying article of claim 23 wherein each of said matrix arrays comprises a checksum for verifying data integrity of each of said matrix arrays independently.

26. The self-verifying article of claim 23 wherein each of said matrix arrays comprises a checksum for verifying data integrity of each of said matrix arrays collectively.

* * * * *